Patented Aug. 26, 1924.

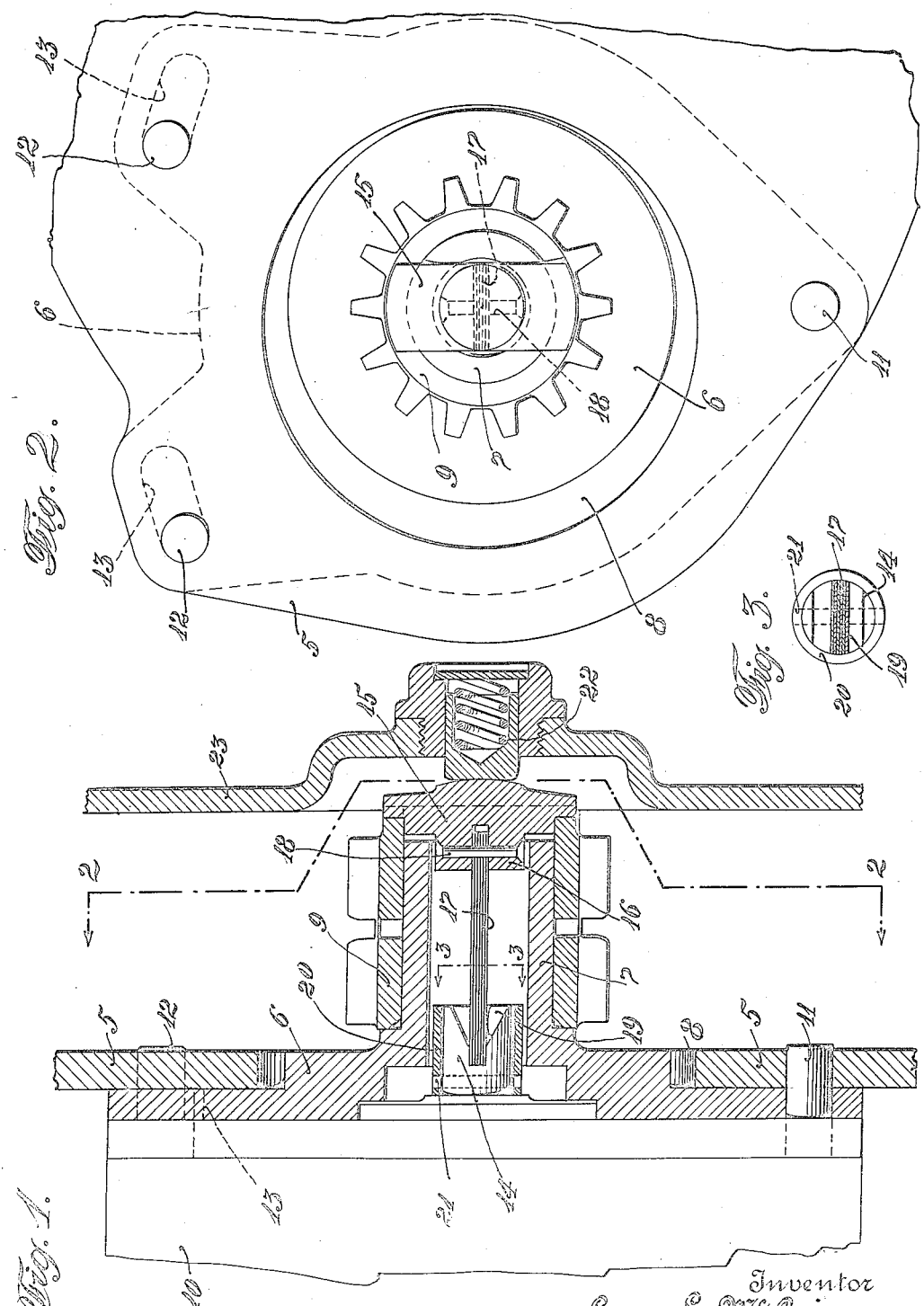

1,506,072

UNITED STATES PATENT OFFICE.

GEORGE L. McCAIN, OF DETROIT, MICHIGAN.

ADJUSTABLE DRIVING CONNECTION.

Application filed May 10, 1921. Serial No. 468,455.

*To all whom it may concern:*

Be it known that I, GEORGE L. MCCAIN, a citizen of the United States, residing at Detroit, in the county of Wayne and State of Michigan, have invented a certain new and useful Improvement in Adjustable Driving Connections, of which improvement the following is a specification.

This invention relates to driving connections for small elements, such as electric generators, motors or magnetos, and more particularly to such devices installed upon the front end of automobile engines, where the generator is usually driven by a chain operating over sprocket wheels. With the construction as heretofore used, the generator is mounted on an adjustable support having a hollow cylindrical bearing portion for the sprocket wheel which has an extension keyed upon the end of the generator shaft extending through the hollow bearing.

The objects of my invention are to increase the flexibility of the driving connection, and to facilitate the operation of dismounting the generator when it is desired to take the same down for inspection or repairs. One of the features of my invention, therefore, comprises a flexible driving connection inserted between the driving sprocket and the generator shaft; and another feature comprises a separable connection between the flexible coupling and one of the driving members, whereby the generator may be readily removed and replaced without taking down the front end or dismounting the sprocket wheel.

In the accompanying drawing: Figure 1 is a vertical section through a generator front end driving connection embodying my improvement; Fig. 2, an end view taken on the line 2—2 of Fig. 1; and, Fig. 3, a section taken on the line 3—3 of Fig. 1.

According to the construction shown, 5 represents the front plate or casing of the engine at the front end of an automobile, and on which is mounted the adjustable support, 6, having a hollow cylindrical bearing portion, 7, extending through an opening, 8, in said front plate, and on which bearing is rotatably mounted the driving sprocket wheel or gear, 9. The generator casing, 10, is rigidly secured to, and supported on, the plate, 6, which is pivotally mounted on the pin, 11, in the frame, 5, and adapted to be swung on said pivot when it is desired to adjust the position of the sprocket wheel to take up the wear of the chain, the movement being limited by the pins, 12, in slots, 13. Any suitable clamping means may be employed for holding the supporting plate, 6, at any desired position.

According to my improvement, I provide a flexible driving connection or coupling between the sprocket, 9, and the shaft, 14, of the generator, and, as shown, this comprises a cap or bar, 15, fitted in diametrically opposite notches formed in the outer edge of the sprocket wheel, 9, and having a cylindrical boss, 16, extending within the hollow end of the bearing, 7, and provided with a slot in which is mounted one end of a set or plurality of thin flat metal plates or leaves, 17, the other end of which extends into a slot in the end of the generator shaft, 14. The thin plates may be secured in the slot in the cap, 15, by means of a pin, 18, but the other end of the pack of plates simply has a sliding fit within the slotted end of the shaft, 14, which is preferably provided with a bevelled or flared opening, 19, to facilitate the entrance of the plates into the slot. A bushing or sleeve, 20, may be placed around the end of said shaft and secured by a pin, 21, in order to prevent the plates from slipping sidewise out of the slot. The thin spring plates are preferably of steel and form a flexible and elastic driving connection from the sprocket to the generator shaft. A spring pressed plunger, 22, mounted in the outside cover plate, 23, bears upon the outer side of the cap, 15, and holds the same in operative position.

By means of this construction, the bearing of the generator shaft in its casing is relieved from the strain of the drive chain, which greatly reduced the wear and makes a comparatively silent operation. With the sliding fit of the spring plates in the slot at the end of the generator shaft, the generator may be readily removed and replaced without taking down the front end casing, whereby much time is saved. The spring plates also provide a flexible connection which not only relieves the generator from jars and shocks, but also compensates for any inaccuracy of alinement between the driving element and the generator shaft at all times.

Having now described my invention, what

I claim as new and desire to secure by Letters Patent is:

1. In a driving connection, the combination of a supporting plate having a tubular bearing portion projecting therefrom, a driving wheel mounted on said bearing, a cap extending over the end of said tubular bearing and connected to the driving wheel, said cap having a boss containing a slot, a driven shaft carried by said support and having a slot in its end, and a pack of thin flexible metal plates secured at one end in the slot in said boss and extending through the tubular bearing into the slot in the end of said shaft.

2. In a driving connection, the combination of a front plate, a supporting plate pivotally mounted thereon and having a tubular bearing portion projecting through an enlarged opening in said front plate, a driving wheel mounted on said bearing, a cap extending over the end of said tubular bearing and connected to the driving wheel, a generator and shaft carried on said supporting plate, said generator shaft having a slot, and a pack of thin flexible metal plates extending through said tubular bearing and connecting said cap with the end of the generator shaft.

3. In a driving connection, the combination of a supporting plate having a tubular bearing portion projecting therefrom, a driving wheel mounted on said bearing, a cap extending over the end of said tubular bearing and connected to the driving wheel, a driven shaft carried by said support and having a slot with a flared opening in its end, a pack of thin flexible metal plates secured to said cap and extending through said tubular bearing into the slot in the end of said shaft, and a sleeve around the end of said shaft over the ends of the slot.

4. In a driving connection, the combination of a support having a hollow bearing, a driving wheel mounted thereon, a driven shaft carried by said support and having a slot in its end, a cap connected to said driving wheel over the end of the hollow bearing and having a slot, and a plurality of thin flexible metal plates secured in the slot of one member and extending through said hollow bearing into the slot in the other member.

5. In a driving connection, the combination of an adjustable support having a hollow bearing, a driving element rotatably mounted on said bearing, a driven element carried by said support, a coupling extending through said hollow bearing, a cover plate, and a spring acting between said cover plate and coupling to hold the parts in position.

In testimony whereof I have hereunto set my hand.

GEORGE L. McCAIN.